(12) United States Patent
Clark et al.

(10) Patent No.: US 11,021,987 B2
(45) Date of Patent: Jun. 1, 2021

(54) CMC BOAS ARRANGEMENT

(71) Applicant: United Technologies Corporation, Farmington, CT (US)

(72) Inventors: Thomas E. Clark, Sanford, ME (US); William M. Barker, North Andover, MA (US); Daniel J. Whitney, Topsham, ME (US); Danielle Mahoney, Dover, NH (US); William Wangard, III, Stratham, NH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/412,737

(22) Filed: May 15, 2019

(65) Prior Publication Data

US 2020/0362717 A1    Nov. 19, 2020

(51) Int. Cl.
*F01D 11/08* (2006.01)
*F01D 25/00* (2006.01)

(52) U.S. Cl.
CPC ............ *F01D 11/08* (2013.01); *F01D 25/005* (2013.01); *F05D 2240/55* (2013.01); *F05D 2300/6033* (2013.01)

(58) Field of Classification Search
CPC .......... F01D 9/04; F01D 11/08; F01D 25/005; F01D 25/14; F01D 25/24; F01D 25/243; F01D 25/246; F01D 25/28; F05D 2240/11; F05D 2240/14; F05D 2240/55
See application file for complete search history.

(56) References Cited

U.S. PATENT DOCUMENTS

| 6,139,257 | A | * | 10/2000 | Proctor | F01D 9/04 |
| | | | | | 415/115 |
| 6,575,697 | B1 | * | 6/2003 | Arilla | F01D 11/005 |
| | | | | | 415/173.1 |
| 6,702,550 | B2 | | 3/2004 | Darkins, Jr. et al. | |
| 6,758,653 | B2 | | 7/2004 | Morrison | |
| 2007/0025837 | A1 | | 2/2007 | Pezzetti | |

(Continued)

FOREIGN PATENT DOCUMENTS

| EP | 1965031 | 9/2008 |
| EP | 3366892 | 8/2018 |

OTHER PUBLICATIONS

Extended European Search Report for EP Application No. 20174478.6 dated Aug. 14, 2020.

*Primary Examiner* — Courtney D Heinle
*Assistant Examiner* — Sang K Kim
(74) *Attorney, Agent, or Firm* — Carlson, Gaskey & Olds, P.C.

(57) ABSTRACT

A blade outer air seal assembly includes a support structure. A blade outer air seal has a plurality of segments that extend circumferentially about an axis and mounted in the support structure via a carrier. At least one of the plurality of segments has a base portion that extends between a first circumferential side and a second circumferential side and from a first axial side to a second axial side. A first hook extends from the base portion near the first axial side and faces towards the second axial side. A second hook extends from the base portion near the second axial side and faces towards the first axial side. A slot is in the second hook configured to receive a pin.

18 Claims, 6 Drawing Sheets

(56) References Cited

U.S. PATENT DOCUMENTS

| | | | |
|---|---|---|---|
| 2017/0044920 A1* | 2/2017 | Vetters | F01D 11/12 |
| 2018/0149034 A1* | 5/2018 | Roussille | F01D 25/246 |
| 2018/0149041 A1 | 5/2018 | Freeman et al. | |
| 2018/0149042 A1* | 5/2018 | Freeman | F01D 25/246 |
| 2018/0156068 A1* | 6/2018 | Roussille | F01D 11/08 |
| 2018/0238193 A1 | 8/2018 | Baucco | |
| 2019/0218928 A1* | 7/2019 | Ciamarra | F01D 11/005 |
| 2020/0025011 A1* | 1/2020 | Barker | F01D 11/08 |

* cited by examiner

CMC BOAS ARRANGEMENT

BACKGROUND

This application relates to a ceramic matrix composite blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a blade outer air seal assembly includes a support structure. A blade outer air seal has a plurality of segments that extend circumferentially about an axis and mounted in the support structure via a carrier. At least one of the plurality of segments has a base portion that extends between a first circumferential side and a second circumferential side and from a first axial side to a second axial side. A first hook extends from the base portion near the first axial side and faces towards the second axial side. A second hook extends from the base portion near the second axial side and faces towards the first axial side. A slot is in the second hook configured to receive a pin.

In a further embodiment of the above, the carrier includes a platform that is engaged with the first and second hooks.

In a further embodiment of any of the above, the platform is engaged with the first and second hooks for at least half of a circumferential width of the base portion.

In a further embodiment of any of the above, an intersegment seal is arranged in the platform.

In a further embodiment of any of the above, the carrier has a hole. The pin extends through the hole and through the slot.

In a further embodiment of any of the above, the carrier includes a platform and a carrier hook. The hole extends through the platform and the carrier hook.

In a further embodiment of any of the above, the pin is a split pin.

In a further embodiment of any of the above, the pin has a first diameter and a second diameter smaller than the first diameter. The first diameter is engaged with the hole on the carrier and the second diameter is engaged with the slot.

In a further embodiment of any of the above, the pin has a diameter between about 0.125 and 0.250 inches (3.175-6.35 mm).

In a further embodiment of any of the above, at least one scallop is machined into the first hook and is configured to receive a portion of a vane structure or a support structure.

In a further embodiment of any of the above, the first hook is formed having a first radius of curvature. The second hook is formed having a second radius of curvature different from the first radius of curvature.

In a further embodiment of any of the above, the carrier is formed from a metallic material.

In a further embodiment of any of the above, the blade outer air seal is formed from a ceramic material.

In another exemplary embodiment, a turbine section for a gas turbine engine includes a turbine blade that extends radially outwardly to a radially outer tip and for rotation about an axis of rotation. A blade outer air seal has a plurality of segments mounted in a support structure via a carrier. The plurality of segments are arranged circumferentially about the axis of rotation and radially outward of the outer tip. At least one seal segment has a base portion that extends between a first circumferential side and a second circumferential side and from a first axial side to a second axial side. A first hook extends from the base portion near the first axial side and faces towards the second axial side. A second hook extends from the base portion near the second axial side and faces towards the first axial side. A pin extends through the carrier and a slot on the seal segment.

In a further embodiment of any of the above, the carrier has an axially extending platform that is configured to engage the first and second hooks.

In a further embodiment of any of the above, the carrier has a first carrier hook that is engaged with the support structure.

In a further embodiment of any of the above, the pin has a first diameter and a second diameter smaller than the first diameter. The first diameter is engaged with a hole on the carrier. The second diameter is engaged with the slot.

In a further embodiment of any of the above, the carrier is formed from a metallic material.

In a further embodiment of any of the above, the seal segment is formed from a ceramic material.

In another exemplary embodiment, a method of assembling a blade outer air seal assembly includes providing a seal segment that has a base portion that extends between a first circumferential side and a second circumferential side and from a first axial side to a second axial side. A first hook extends from the base portion near the first axial side and faces towards the second axial side. A second hook extends from the base portion near the second axial side and faces towards the first axial side. The seal segment is assembled onto a carrier in a circumferential direction. A pin is inserted in a radial direction into a hole on the carrier and a slot on the seal segment.

DETAILED DESCRIPTION

Figure 1:
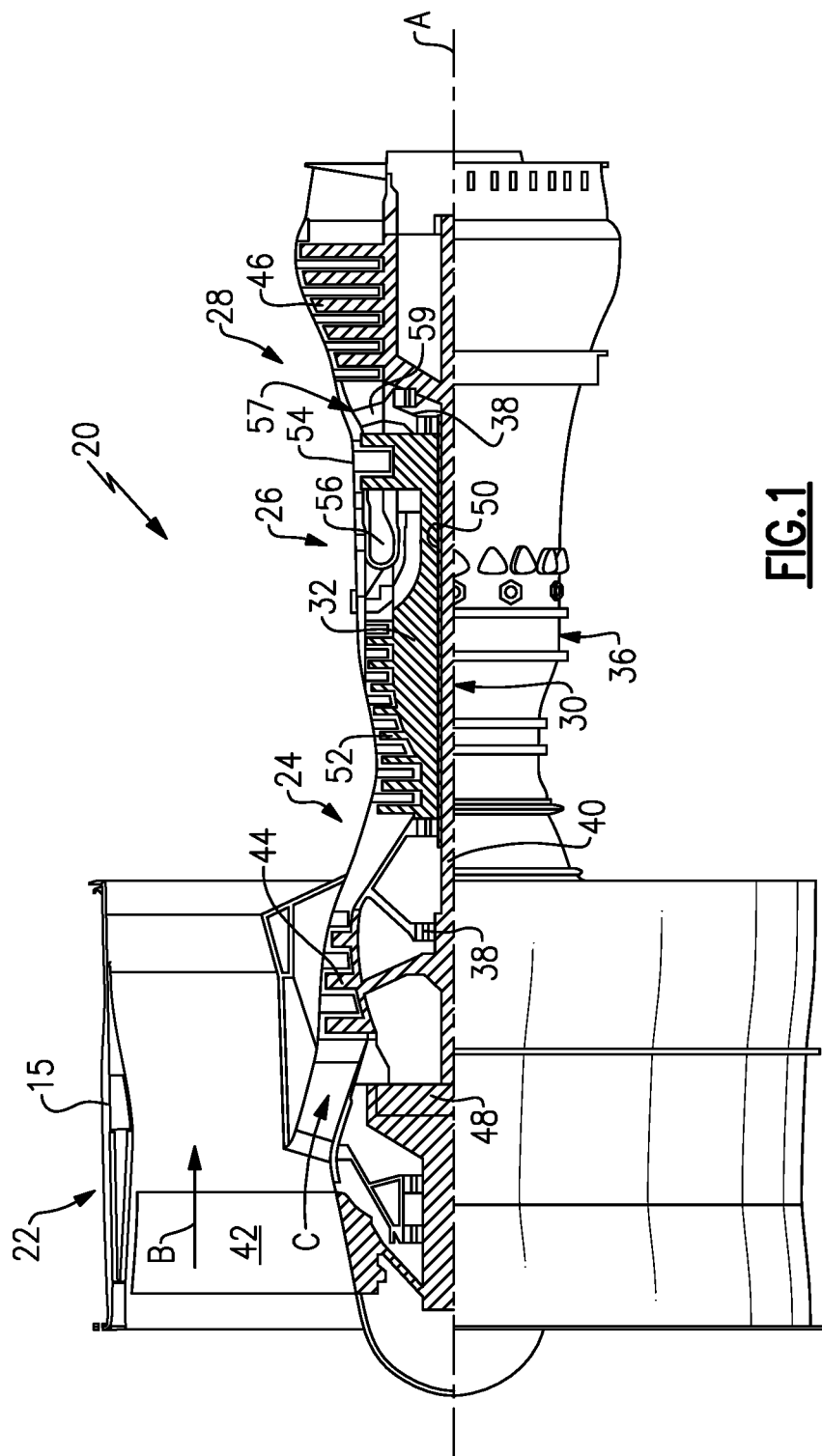
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
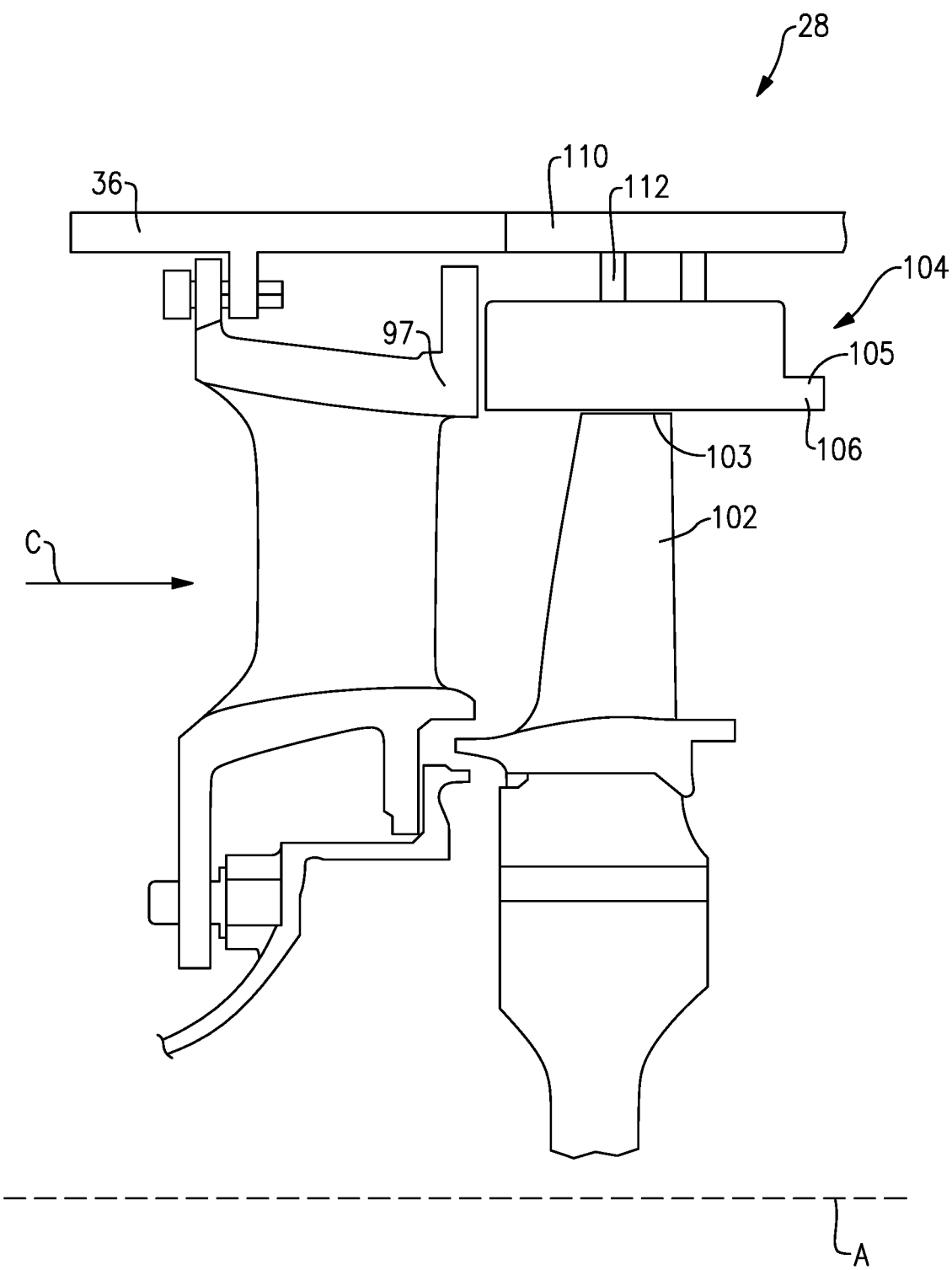
FIG. 2 shows an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a high thermal-resistance, low-toughness material, such as a ceramic matrix composite ("CMC").

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
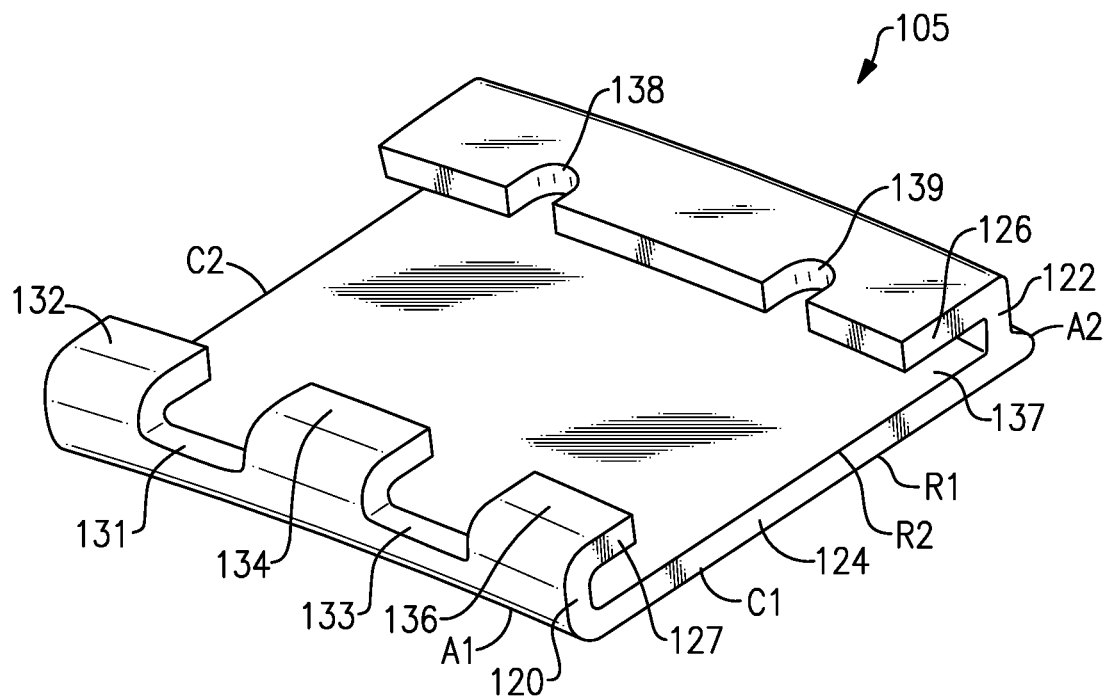
FIG. 3 shows an exemplary blade outer air seal.

FIG. 3 shows an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 and a second wall 122 that extend radially outward from a base portion 124. The first and second walls 120, 122 extend along the base portion 124 in a generally circumferential direction, and are axially spaced from one another. The base portion 124 extends between the first and second axial sides A1, A2 and the first and second circumferential sides C1, C2. The base portion 124 defines a gas path on a radially inner side and a non-gas path on a radially outer side. In this disclosure, forward, aft, upstream, downstream, axial, radial, or circumferential is in relation to the engine axis A unless stated otherwise. A passage 137 is defined radially inward of the base portion 124 between the first and second walls 120, 122. The passage 137 extends generally circumferentially across the base portion 124. In some examples, the base portion 124 may extend axially forward and/or aft of the first and second walls 120, 122 to provide a surface for sealing of the leading and trailing edges.

The first wall 120 includes a hook portion 127 extends axially aft towards the second axial side A2. In an embodiment, the hook portion 127 is separated into three separate hooks 132, 134, 136 separated by scallops 131, 133. The scallops 131, 133 are portions removed from the first wall 120. The second wall 122 includes a hook 126 that extends axially forward towards the first axial side A1. The hooks 127, 126 are the radially outermost portion of the seal segment 105. The hooks 127, 126 extend axially inward towards one another. The hooks 127, 126 are configured to secure the seal segment 105 to the carrier 112.

A slot 138 is formed on the hook 126. In the illustrated embodiment, the slot 138 is not centered on the seal segment 105 in the circumferential direction. The slot 138 is configured to prevent rotation of the seal segment 105 relative to the carrier 112. In some examples, a second slot 139 may be arranged on the hook 126. The second slot 139 may be arranged symmetrically to the slot 138 about a center axis of the seal segment 105 that is arranged in the axial direction. The second slot 139 may provide symmetry in the seal segment 105 to help distribute stress loads created from the slot 138.

Figure 4:
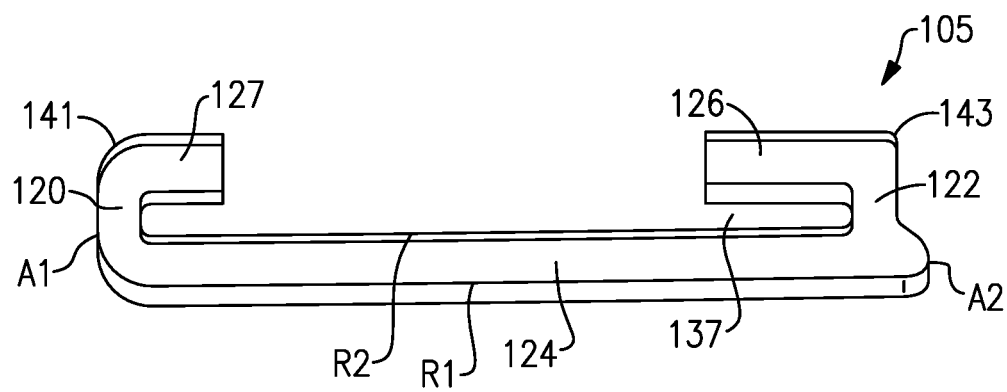
FIG. 4 shows a side view of the exemplary blade outer air seal.

FIG. 4 illustrates a side view of the seal segment 105. The first wall 120 and hook portion 127 are formed having a first radius of curvature at location 141. The second wall 122 and second hook 126 are formed having a second radius of curvature at location 143. The second radius of curvature may be smaller than the first radius of curvature. In one example, the second radius of curvature is between about 0 and 3 inches (0-7.62 cm) smaller than the first radius of curvature. The first radius of curvature may be about 16 inches (40.64 cm), in one example. The hook 127 near the leading edge may integrally provide flow path transition surfaces because of the radius of curvature at the location 141. The hook 126 near the trailing edge may also provide a flow path transition feature formed from the integral CMC layers of the seal segment 105. In one embodiment, the hooks 126, 127 extend about the same distance from the base portion 124 in the radial direction. In the illustrated example, the hooks 126, 127 extend in a direction perpendicular to the walls 120, 122. In other examples, the hooks 126, 127 may extend at an angle relative to the walls 120, 122.

Figure 5:
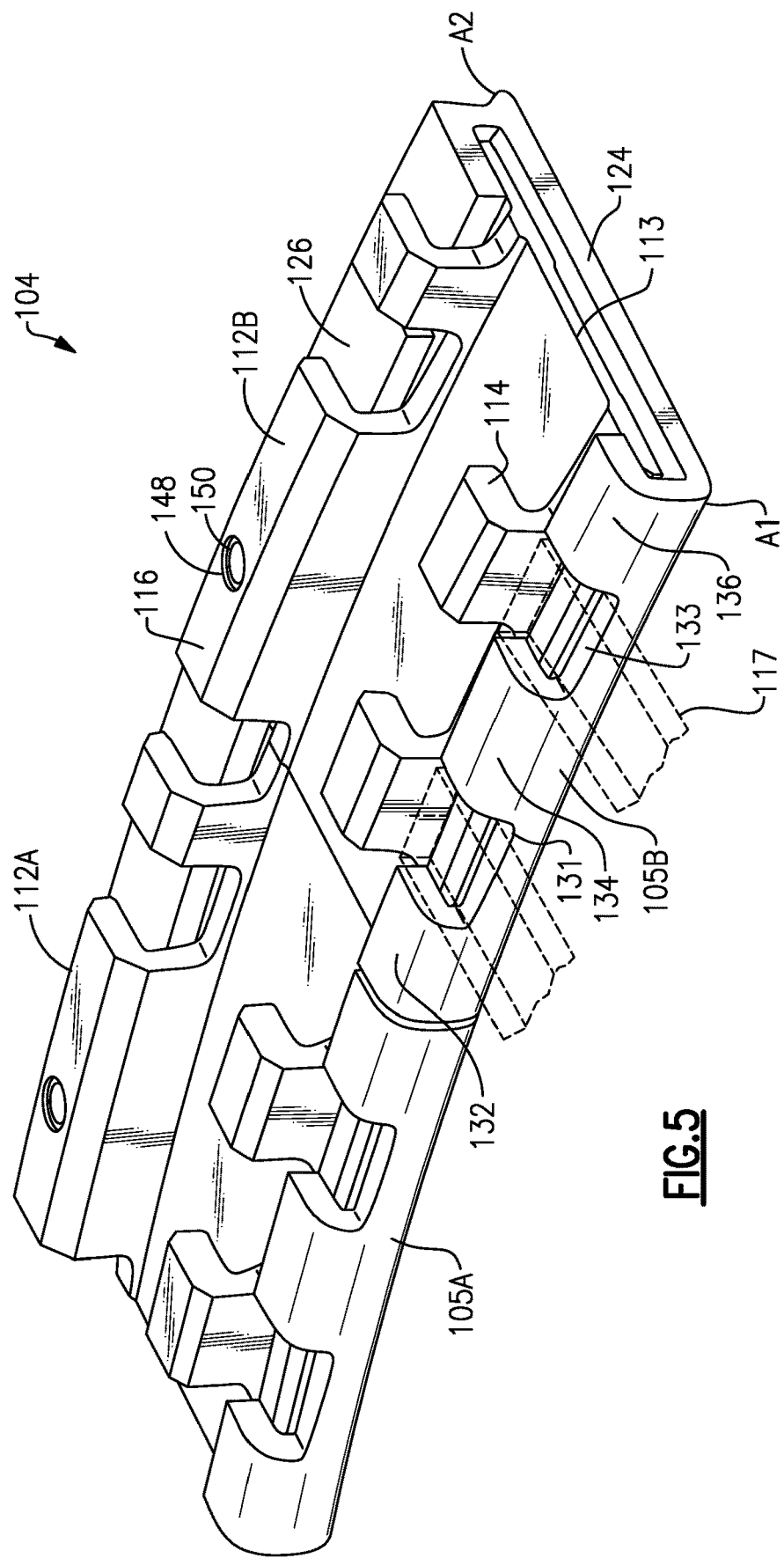
FIG. 5 shows a portion of an exemplary blade outer air seal assembly.

FIG. 5 illustrates a portion of an example BOAS assembly 104. The seal segments 105 are mounted on a carrier 112. In this example, the carrier 112 is segmented into carrier segments 112A, 112B. In some examples, the assembly 104 includes the same number of carrier segments as seal segments 105.

Each carrier segment 112A, 112B has a platform 113 with axially spaced hooks 114, 116. The hooks 114, 116 extend radially outward from the platform 113 for attaching the carrier 112 and seal segment 105 to the support structure 110 (shown in FIG. 2). A portion of the platform 113 engages with the hooks 126, 127. The platform 113 is generally parallel to the base portion 124 of the seal segment 105. The hooks 126, 127 provide engagement with the carrier 112 along all or most of the axial length of the carrier 112. The carrier hooks 114, 116 extend generally parallel to the seal segment hooks 126, 127. That is, the carrier hooks 114, 116 and seal segment hooks 126, 127 extend generally circumferentially.

In some examples, a structure 117 extends through the scallops 131, 133. The structure 117 may be a portion of the vane 97 (shown in FIG. 2). In this way, the carrier 112 may support some of the load from the structure 117. In other examples, the structure 117 is part of a support structure or ring. The scallops 131, 133 help prevent the loads from the structure 117 from pinching the ceramic seal segment 105. The scallops 131, 133 may also help ensure the seal segment 105 maintains at least three point contact with the carrier 112.

The carrier 112 may be a metallic component. The carrier may be cast, for example. In one embodiment, the carrier 112 is single crystal nickel. The carrier 112 may be uncoated, or may have a thermal barrier coating. The disclosed carrier 112 may provide radiant shielding to the exterior turbine case.

A hole 148 extends through the hook 116 on the carrier 112. The hole 148 is generally aligned with the slot 138 in the circumferential and axial directions when a seal segment 105 is mounted in the carrier 112. The hole 148 receives a pin 150.

In some examples, a wear liner may be arranged between the seal segment 105 and the carrier 112. The wear liner may be a metallic material such as cobalt, for example. The wear liner may be formed from sheet metal.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. The fibers may be coated by a boron nitride. In other examples, the BOAS 106 may be made of a monolithic ceramic.

CMC components such as BOAS segments 105 are formed by laying fiber material, such as laminate sheets or braids, in tooling, injecting an infiltrant into the tooling, and curing to form a solid composite component. The component may be densified by adding additional material to further stiffen the laminates. The BOAS segments 105 may be formed by wrapping braided plies about a mandrel, or draping woven plies and curving them into the final shape. The BOAS segments 105 may be formed from 8-harness satin weave (8HS) laminates, for example.

Figure 6:
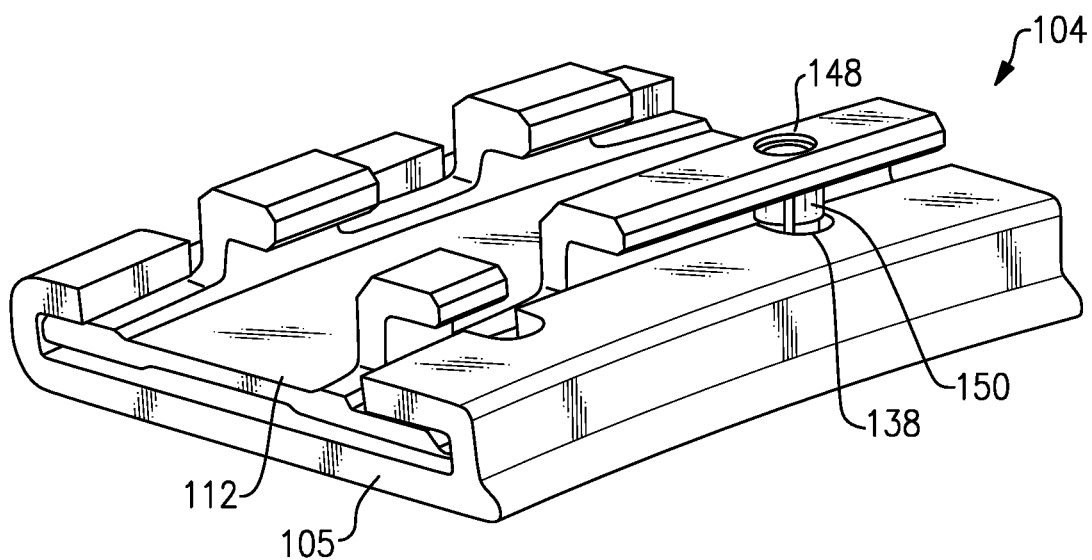
FIG. 6 shows a portion of the exemplary blade outer air seal assembly.

As shown in FIG. 6, the pin 150 extends in a radial direction through the hole 148 on the carrier 112 and the slot 138 on the seal segment 105. In the illustrated example, the pin 150 is rounded. However, other shaped pins may fall within the scope of this disclosure. The pin 150 may be a split pin, for example, to permit the pin 150 to be compressed during insertion. The pin 150 may help prevent sliding or rotation of the seal segment 105 relative to the carrier 112.

Figure 7:
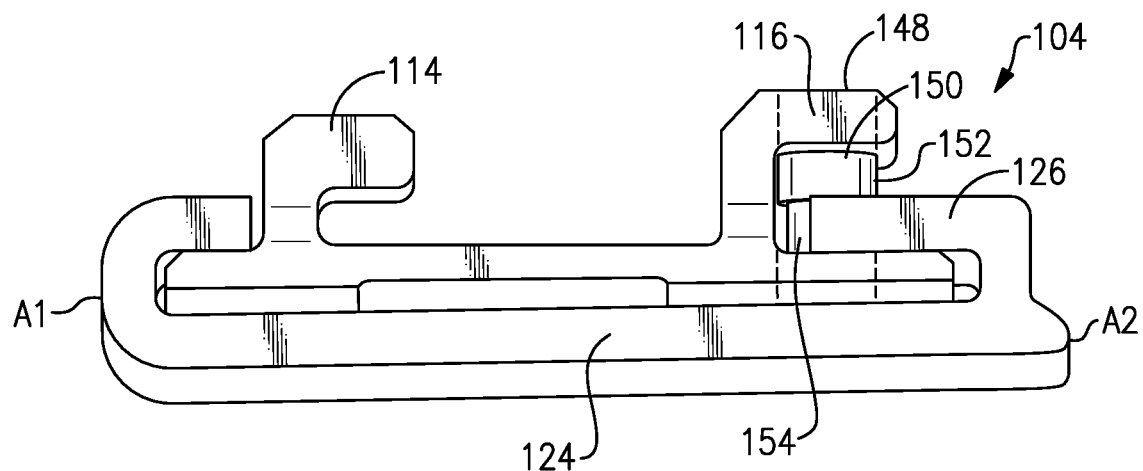
FIG. 7 shows a side view of a portion of the exemplary blade outer air seal assembly.

FIG. 7 illustrates a side view of the example blade outer air seal assembly 104. In some examples, the pin 150 may have a first diameter portion 152 and a second diameter portion 154. In this example, the first diameter portion 152 is engaged with the hole 148 and the second diameter portion 154 is engaged with the slot 138 on the seal segment 105. The first diameter portion 152 has a larger diameter than the second diameter portion 154. The first diameter portion 152 is radially outward of the second diameter portion 154. The two diameters may prevent the pin 150 from dropping radially inward through the hole 148. In one example, the pin 150 may have a diameter of between about 0.125 and 0.250 inches (3.175-6.35 mm). In a further example, the pin 150 may have a diameter of about 0.19 inches (4.826 mm).

Figure 8:
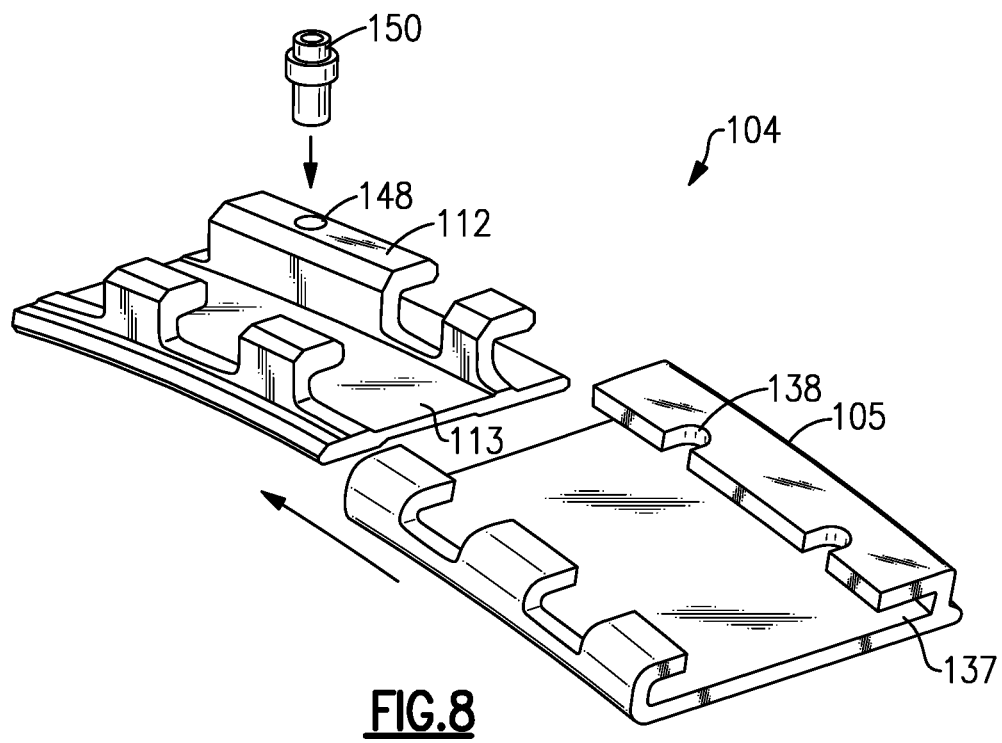
FIG. 8 shows a method step of assembling the exemplary blade outer air seal assembly.

FIG. 8 illustrates an example method of assembling the blade outer air seal assembly 104. The seal segment 105 is assembled onto the carrier 112 in a circumferential direction. The seal segment 105 is slid over the carrier 112 such that the platform 113 of the carrier 112 is arranged within the passage 137. Once the seal segment 105 and carrier 112 are assembled together, the hole 148 and the slot 138 are aligned in the circumferential direction. Then, the pin 150 is inserted into the hole 148 and the slot 138. The pin 150 is inserted in a generally radial direction. The pin 150 secures the seal segment 105 onto the carrier 112. The pin 150 may prevent the seal segment 105 from rotating or sliding relative to the carrier 112.

Figure 9:
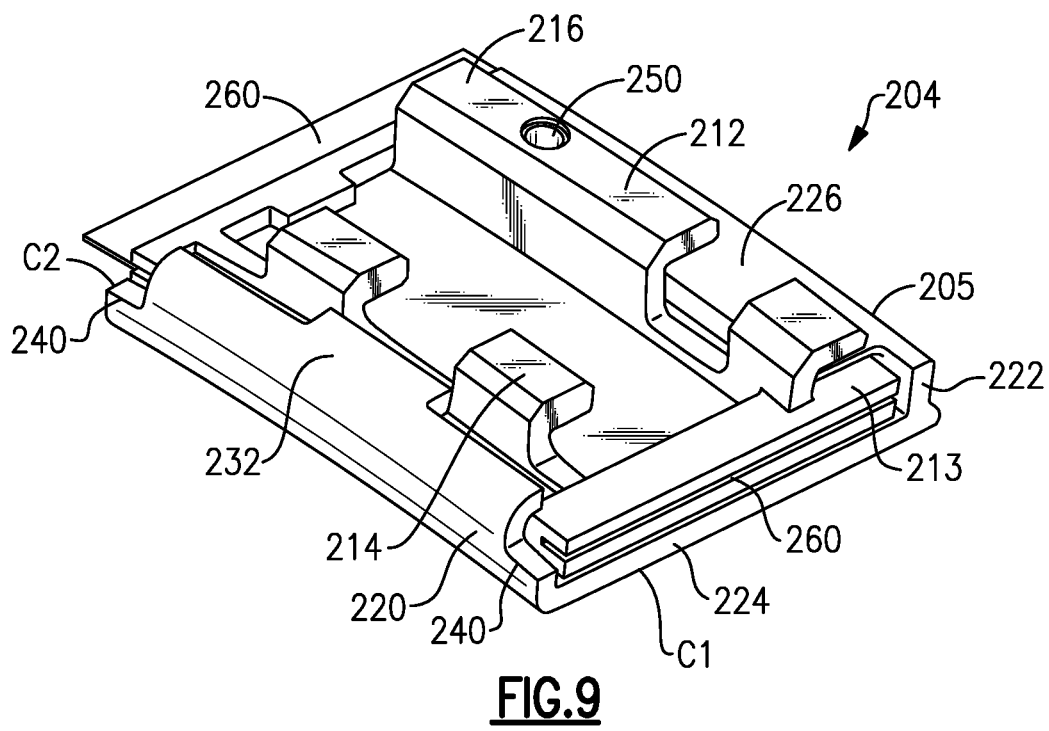
FIG. 9 shows another exemplary blade outer air seal assembly.

FIG. 9 illustrates another example blade outer air seal assembly 204. In this example, the seal segment 205 may have fewer features, and the carrier 212 may have more features. For example, the carrier 212 may include a slot 260 for receiving an intersegment seal. An intersegment seal 260 may be arranged between each of the carrier segments in the slot 260. This example seal segment 205 may have a single hook 232 on the leading edge. This arrangement may provide stable three point contact to the carrier 212. The hook 232 may have relief cuts 240 near the first and second circumferential sides C1, C2 to provide clearance for an intersegment seal 260, such as a feather seal. The carrier 212 may be cast or wrought, for example. This example assembly 204 may also be assembled via the method shown in FIG. 8, with the pin 250 securing the carrier 212 and seal segment 205 together.

The disclosed assembly provides a low profile CMC BOAS mounting system that may reduce stress on the CMC BOAS and improve cooling of the BOAS support structure and/or carrier. The disclosed blade outer air seal arrangement provides inward facing circumferential hooks that provide at least three point contact between the seal segment and the carrier. This assembly may reduce metallic interface temperatures by enabling active cooling of disclosed BOAS support. The assembly may reduce radiant heat loads into exterior turbine cases from full-width BOAS support pressure wall. In some examples, the carrier provides a slot for mateface sealing. This may provide a small, controllable pressure drop across the backside of the carrier to the BOAS, which may provide reduced BOAS pressure loads. The pressure drop may enable cooling features to be incorporated into the BOAS support structure and/or carrier.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
a support structure;
a blade outer air seal having a plurality of segments extending circumferentially about an axis and mounted in the support structure via a carrier, wherein the carrier has a platform and a carrier hook; and
at least one of the plurality of segments having a base portion extending between a first circumferential side and a second circumferential side and from a first axial side to a second axial side, a first hook extending from the base portion near the first axial side and facing towards the second axial side and a second hook extending from the base portion near the second axial side and facing towards the first axial side, and a slot in the second hook; and
a pin extends radially through a hole in the carrier hook and the slot, wherein the pin has a first diameter and a second diameter smaller than the first diameter, the first diameter engaged with the hole on the carrier and the second diameter engaged with the slot and the first diameter is radially outward of the second diameter.

2. The blade outer air seal assembly of claim 1, wherein the carrier platform is engaged with the first and second hooks.

3. The blade outer air seal assembly of claim 2, wherein the platform is engaged with the first and second hooks for at least half of a circumferential width of the base portion.

4. The blade outer air seal assembly of claim 2, wherein an intersegment seal is arranged in the platform.

5. The blade outer air seal assembly of claim 1 wherein the hole extends through the platform and the carrier hook.

6. The blade outer air seal assembly of claim 1, wherein the pin is a split pin.

7. The blade outer air seal assembly of claim 1, wherein the pin has a diameter between 0.125 and 0.250 inches (3.175-6.35 mm).

8. The blade outer air seal assembly of claim 1, wherein at least one scallop is machined into the first hook and configured to receive a portion of a vane structure or the support structure.

9. The blade outer air seal assembly of claim 1, wherein the first hook is formed having a first radius of curvature, and the second hook is formed having a second radius of curvature different from the first radius of curvature.

10. The blade outer air seal assembly of claim 9, wherein the second radius of curvature is less than 3 inches smaller than the first radius of curvature.

11. The blade outer air seal assembly of claim 1, wherein the carrier is formed from a metallic material.

12. The blade outer air seal assembly of claim 1, wherein the blade outer air seal is formed from a ceramic material.

13. A turbine section for a gas turbine engine, comprising:
a turbine blade extending radially outwardly to a radially outer tip and for rotation about an axis of rotation;
a blade outer air seal having a plurality of segments mounted in a support structure via a carrier, the plurality of segments arranged circumferentially about the axis of rotation and radially outward of the outer tip, wherein the carrier has a first carrier hook that is engaged with the support structure;
at least one seal segment having a base portion extending between a first circumferential side and a second circumferential side and from a first axial side to a second axial side, a first hook extending from the base portion near the first axial side and facing towards the second axial side and a second hook extending from the base portion near the second axial side and facing towards the first axial side; and a pin extending radially through a hole in the carrier hook and a slot on the seal segment, wherein the pin has a first diameter and a second diameter smaller than the first diameter, the first diameter engaged with the hole on the carrier and the second diameter engaged with the slot and the first diameter is radially outward of the second diameter.

14. The turbine section of claim 13, wherein the carrier has an axially extending platform that is configured to engage the first and second hooks.

15. The turbine section of claim 13, wherein the pin has a first diameter and a second diameter smaller than the first diameter, the first diameter engaged with a hole on the carrier and the second diameter engaged with the slot.

16. The turbine section of claim 13, wherein the carrier is formed from a metallic material.

17. The turbine section of claim 13, wherein the seal segment is formed from a ceramic material.

18. A method of assembling a blade outer air seal assembly, comprising:

providing a seal segment having a base portion extending between a first circumferential side and a second circumferential side and from a first axial side to a second axial side, a first hook extending from the base portion near the first axial side and facing towards the second axial side and a second hook extending from the base portion near the second axial side and facing towards the first axial side;

assembling the seal segment onto a carrier in a circumferential direction wherein the carrier has a first carrier hook; and inserting a pin in a radial direction into a hole in the first carrier hook and a slot on the seal segment, wherein the pin has a first diameter and a second diameter smaller than the first diameter, the first diameter engaged with the hole on the carrier and the second diameter engaged with the slot and the first diameter is radially outward of the second diameter.

* * * * *